United States Patent
Yenkappa (10) Patent No.: US 9,667,988 B2
(45) Date of Patent: May 30, 2017

(54) METHOD AND APPARATUS FOR REDUCING REDUNDANCY IN RESIDUE SIGNAL IN VIDEO DATA COMPRESSION

(71) Applicant: SAMSUNG ELECTRONICS CO., LTD., Suwon-si, Gyeonggi-do (KR)

(72) Inventor: Deepak Thumathajira Yenkappa, Karnataka (IN)

(73) Assignee: Samsung Electronics Co., Ltd., Suwon-Si, Gyeonggi-do (KR)

( * ) Notice: Subject to any disclaimer, the term of this patent is extended or adjusted under 35 U.S.C. 154(b) by 550 days.

(21) Appl. No.: 14/259,602

(22) Filed: Apr. 23, 2014

(65) Prior Publication Data
US 2015/0312583 A1 Oct. 29, 2015

(51) Int. Cl.
*H04N 19/50* (2014.01)
(52) U.S. Cl.
CPC .................... *H04N 19/50* (2014.11)
(58) Field of Classification Search
CPC .................... H04N 19/50; H04N 19/176
See application file for complete search history.

(56) References Cited

U.S. PATENT DOCUMENTS

| | | | | |
|---|---|---|---|---|
| 5,818,531 A | * | 10/1998 | Yamaguchi | G06T 3/40 375/240.2 |
| 2009/0067495 A1 | * | 3/2009 | Au | H04N 19/176 375/240.12 |

* cited by examiner

*Primary Examiner* — Zhubing Ren
(74) *Attorney, Agent, or Firm* — Lee & Morse, P.C.

(57) ABSTRACT

A method of processing video data includes generating a prediction signal (PS) corresponding to a Macro Block (MB), calculating a prediction residue signal (PRS) of the MB from the prediction signal (PS), predicting a reconstructed prediction residual signal (RPRS) from a reconstructed residue reference frame (RRRF), and identifying an error of residue signal (EORS) by subtracting the RPRS from the PRS. The method further includes comparing the PRS of the MB and the EORS, identifying a residue signal having a least error value based on a result of the comparison, and generating an encoded bit stream for transmission based on the residue signal having the least error value. The residue signal is identified by correlating the prediction residue signal of the MB and the RPRS of a reference frame.

17 Claims, 6 Drawing Sheets

METHOD AND APPARATUS FOR REDUCING REDUNDANCY IN RESIDUE SIGNEL IN VIDEO DATA COMPRESSION

BACKGROUND

1. Field

One or more embodiments described herein relate to processing video data.

2. Description of the Related Art

In the transmission of video streams, efforts are continually being made to reduce the amount of data to be transmitted, while at the same time allowing the data to be adequately recreated at the receiver. The data reduction is usually performed by an encoding technique.

A typical video stream includes a sequence of "raw" video frames, each representing an image at a respective moment in time. The raw video frames are encoded into one of two types: an intra-frame (or key frame) or an inter frame. The encoding compresses the video data into fewer bits for transmission or storage.

An intra-frame may be compressed using only data from a currently encoded video frame. Compression of an intra-frame may be performed using intra frame prediction coding, in which one image portion within the frame is encoded and signaled relative to another image portion within that same frame. This is similar to static image coding. An inter frame may be compressed based on knowledge of a preceding frame, e.g., a reference frame. Existing compression and encoding techniques produce an excessive number of bits, which increases the amount of data to be transmitted. This reduces streaming efficiency and performance.

SUMMARY

In accordance with one embodiment, a method of processing video data includes generating a prediction signal (PS) corresponding to a Macro Block (MB); calculating a prediction residue signal (PRS) of the MB from the prediction signal (PS); predicting a reconstructed prediction residual signal (RPRS) from a reconstructed residue reference frame (RRRF); identifying an error of residue signal (EORS) by subtracting the RPRS from the PRS; comparing the PRS of the MB and the EORS; identifying a residue signal having a least error value based on a result of the comparison; and generating an encoded bit stream for transmission based on the residue signal having the least error value, wherein the residue signal is identified by correlating the prediction residue signal of the MB and the RPRS of a reference frame.

Generating the encoded bit stream may include performing a transformation to a frequency domain, quantizing, and entropy coding the residual signal with the least error value to generate the encoded bit stream. The MB prediction signal includes at least one of an intra-prediction signal or an inter-prediction signal.

The RPRS may be calculated from at least one of a collocated macro block of the reference frame, a motion vector of the current MB, or a motion estimation performed on the RRRF. The RPRS may be calculated from the collocated macro block of the reference frame by subtracting the reconstructed PRS from the RRRF corresponding to the collocated MB from the PRS of the current MB, comparing a value of the reconstructed PRS with a value of the PRS, and, if the value of the reconstructed PRS is less than the value of the PRS, selecting the RPRS.

The RPRS from the motion vector of the current MB may be calculated by subtracting the reconstructed PRS from the RRRF corresponding to the motion vector of the current MB from the current PRS; comparing a value of the reconstructed PRS with a value of the PRS; and, if the value of the reconstructed PRS is less than the value of the PRS, selecting the RPRS.

The RPRS may be calculated by performing a motion estimation on the RRRF by performing a search of a current PRS within a search range on the RRRF, wherein the search is performed by selecting the motion vector of the current MB as a starting point; and selecting a RPRS based on the search.

The method may further include providing a flag on a MB header, wherein a value of the flag indicates if the error signal in a bit stream corresponds to the PRS or the EORS, and wherein the flag in the MB header includes an EORS_MB_FLAG. The flag to indicate the presence of error signal in the bit stream includes at least one of an EORS_SEQ_FLAG listed in a sequence header, an EORS_PIC_FLAG listed in a picture header, or an EORS_SLICE_FLAG listed in a slice header.

The method may further include encoding a motion vector difference corresponding to the predicted RPRS in a bit stream, wherein a motion vector difference is calculated by subtracting the selected motion vector from the motion vector of the current MB.

The method may further include reconstructing the PRS based on information extracted from a reconstructed error signal and a reconstructed error of residue signal; and obtaining the residual signal by adding the reconstructed residue signal to the predicted residual signal.

In accordance with another embodiment, an apparatus for processing video data compression includes an error signal predictor module, a subtractor module, and an error signal selector module. The error signal predictor module predicts a reconstructed prediction residual signal (RPRS) from a reconstructed residue reference frame (RRRF). The subtractor module identifies an error of residue signal (EORS) by subtracting the RPRS from a prediction residue signal (PRS) of a Macro Block (MB) from a prediction signal (PS) corresponding to the MB. The an error signal selector module compares the PRS of a current MB and the EORS and identifies a residue signal having a least error value, wherein the error signal selector module identifies the residual signal by correlating the prediction residue signal of the current MB and a reconstructed prediction residue signal (RPRS) of a reference frame.

The apparatus may further include an error reconstruction module configured to reconstruct the PRS based on information extracted from a reconstructed error signal and an reconstructed error of residue signal and obtain the residual signal by adding the reconstructed residue signal to the predicted residual signal.

In accordance with another embodiment, a method for processing video data includes generating a prediction residue signal (PRS) of a macro block of video data, generating a reconstructed prediction residual signal (RPRS) from a reconstructed residue reference frame (RRRF), determining an error of residue signal (EORS) by subtracting the RPRS from the PRS, and generating an encoded bit stream for transmission based on the EORS.

Generating the PSR may include generating a prediction signal (PS) corresponding to the macro block and calculating the PSR based on the PS.

The method may further include comparing the PRS and the EORS and determining a residue signal having a least error value based on a result of the comparison, wherein the encoded bit stream for transmission is generated based on the residue signal having the least error value.

The residue signal having the least error value may be determined by correlating the prediction residue signal and the RPRS of a reference frame. The RPRS may be generated from at least one of a collocated macro block of the reference frame, a motion vector of a current macro block, or a motion estimation performed on the RRRF. The RPRS may be generated from the collocated macro block of the reference frame by subtracting the reconstructed PRS from the RRRF, comparing a value of the reconstructed PRS with a value of the PRS, and, if the value of the reconstructed PRS is less than the value of the PRS, selecting the RPRS.

The RPRS may be determined based on the motion estimation on the RRRF by performing a search of a current PRS within a search range on the RRRF, wherein the search is performed by selecting the motion vector of the current MB as a starting point and selecting a RPRS based on the search.

BRIEF DESCRIPTION OF THE DRAWINGS

Features will become apparent to those of ordinary skill in the art by describing in detail exemplary embodiments with reference to the attached drawings in which.

DETAILED DESCRIPTION

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
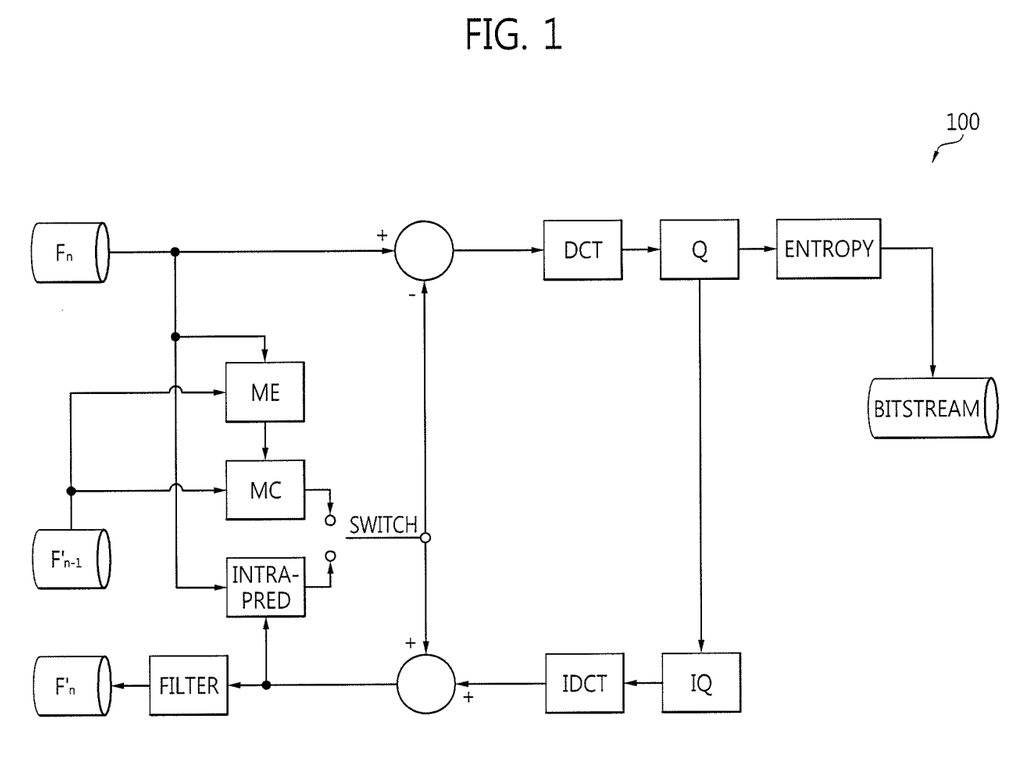
FIG. 1 illustrates one type of H264 encoder.

FIG. 1 illustrates one type of H264 encoder. As shown in FIG. 1, the Fn block corresponds to a current frame to be encoded and the F'n−1 block corresponds to a reference frame. The ME, MC, and Intra-Pred blocks correspond to motion estimation, motion compensation, and Intra prediction respectively. The DCT, Q, IQ, and IDCT blocks correspond forward transform, quantization, inverse quantization, and inverse transform respectively. The FILTER block performs loop filtering.

Figure 2:
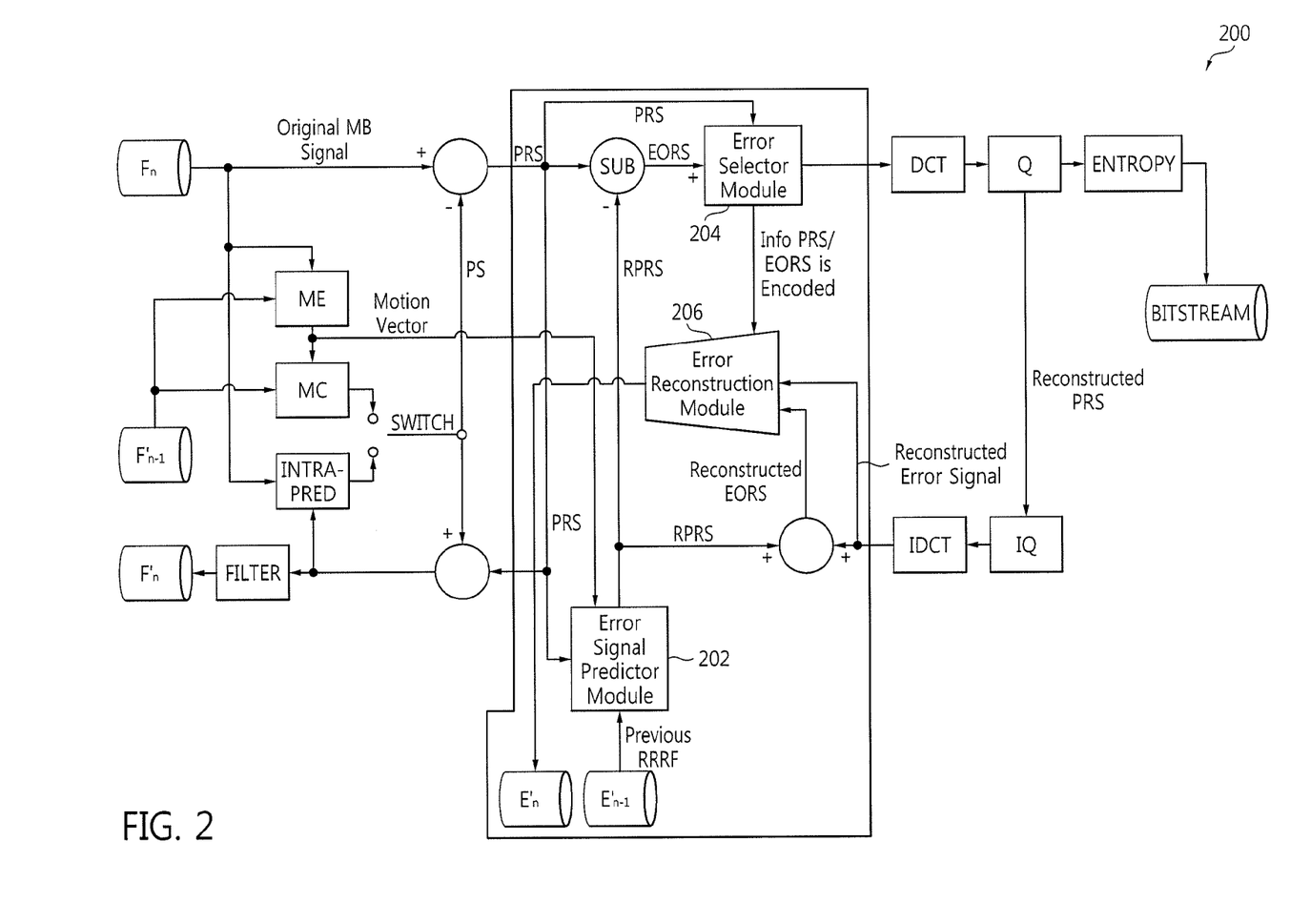
FIG. 2 illustrates an embodiment of a video data compression apparatus.

FIG. 2 illustrates an embodiment of an apparatus 200 for performing video data compression. The video compression apparatus may reduce redundancy in a residue signal while performing video data compression. As illustrated in FIG. 2, the apparatus 200 includes an error signal predictor module 202, an error signal selector module 204, and an error reconstruction module 206.

According to one embodiment, a prediction signal (PS) is generated after prediction of a current macro block (MB). Further, a Prediction Residue Signal (PRS) is calculated by subtracting the PS from a corresponding reference signal. The error signal predictor module 202 predicts a reconstructed prediction residual signal (RPRS) from a reconstructed residue reference frame (RRRF). A subtractor (SUB) identifies the Error of Residue Signal (EORS) by subtracting the RPRS from PRS. The error signal selector module 204 compares the PRS and EORS based on one or more metrics, which includes, but is not limited to, the sum of absolute transformed difference (SATD). Based on the comparison, the error signal selector module 204 may select the signal having the least error value as a residue signal. In other embodiments, the error selector module 204 may select the signal having a predetermined error value different from the least error value. Such a predetermined error value, for example, may correspond to a certain level of performance for streaming or encoding.

According to one embodiment, the error signal selector module 204 identifies the residual signal by correlating the prediction residue signal of the current MB and a reconstructed prediction residue signal (RPRS) of a reference frame. Here, the RPRS for a current inter macro block or intra macro block includes at least one of a RPRS of collocated MB of reference frame, RPRS calculated using motion vector of the current MB, or RPRS calculated by performing motion estimation on RRRF.

The selected residue signal is transformed (DCT), quantized (Q), and entropy coded (Entropy). A bitstream (BIT-STREAM) of video data is then created based on the entropy-coded residue signal, and a transmitter transmits the bit stream to a receiver In a reverse path, the residue signal is inverse quantized (IQ) and inverse transformed (IDCT). Further, the error reconstruction module 206 reconstructs the predicted residue signal (PRS) based on information extracted from a reconstructed error signal and a reconstructed error of the residue signal, and obtains the residual signal by adding the reconstructed residue signal to the predicted residual signal. The residual signal of each MB is stored (e.g., in $E^1n$) for future reference.

Figure 3:
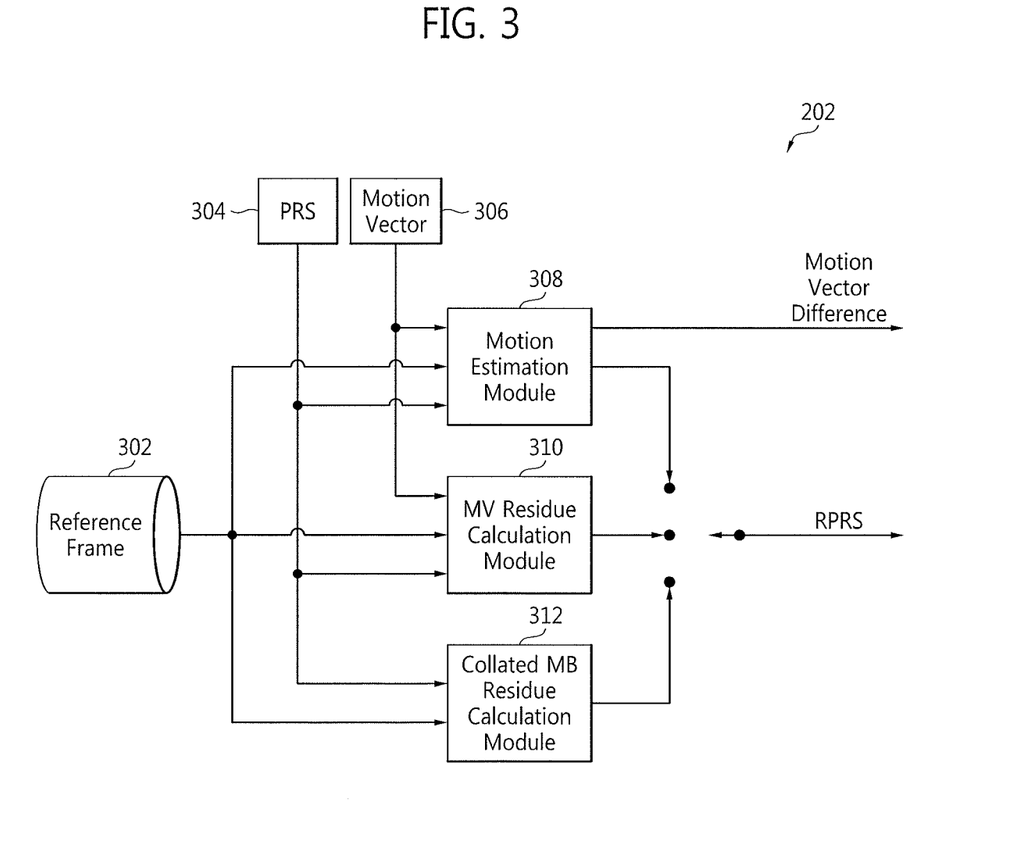
FIG. 3 illustrates an embodiment of an error signal predictor module.

FIG. 3 illustrates an embodiment of an error signal predictor module of the video data compression apparatus. The error signal predictor module 202 includes a motion estimation module 308, a motion vector calculation module 310, and a collocated MB residue calculation module 312.

Each of the modules takes RRRF 302 and PRS 306 as an input. Further, the motion estimation module 308 and the motion vector calculation module 310 takes the motion vector as one of the input. The output signal of 308, 310 and 312 is compared and the signal corresponding to the least error value is selected as the output of error signal predictor module 202.

In the case of motion estimation on RRRF, the output includes a motion vector difference as well. Here, the motion vector difference is calculated by subtracting the selected motion vector from the motion vector of the current MB.

According to one embodiment, the RPRS is calculated from a collocated MB of a reference frame. In this respect, the reconstructed PRS from the RRRF corresponding to the collated MB position is subtracted from the PRS of the current MB. Further the subtracted value is compared with that of the PRS. If the reconstructed PRS is the least (or corresponds to a predetermined level), then it is given as the output of 312 module.

The method of calculating RPRS using the motion vector of the current MB includes subtracting the reconstructed PRS from the RRRF corresponding to the motion vector of the current MB from the current PRS. Further, the value obtained is cost compared with that of the PRS to obtain the RPRS. If the reconstructed PRS is the least (or corresponds to a predetermined level), then it is given as the output of 310 module. This method is used when the current MB is an inter MB.

According to one embodiment, the RPRS is calculated by performing motion estimation on RRRF. This method may be used when the current MB is an Inter MB. A search of the current PRS within a search range is performed on the RRRF, with the motion vector of the current MB used as the start point. The best match is selected as the RPRS and given as the output of 308 module. The motion vector difference is calculated by subtracting the best match motion vector from the current MB motion vector.

Figure 4:
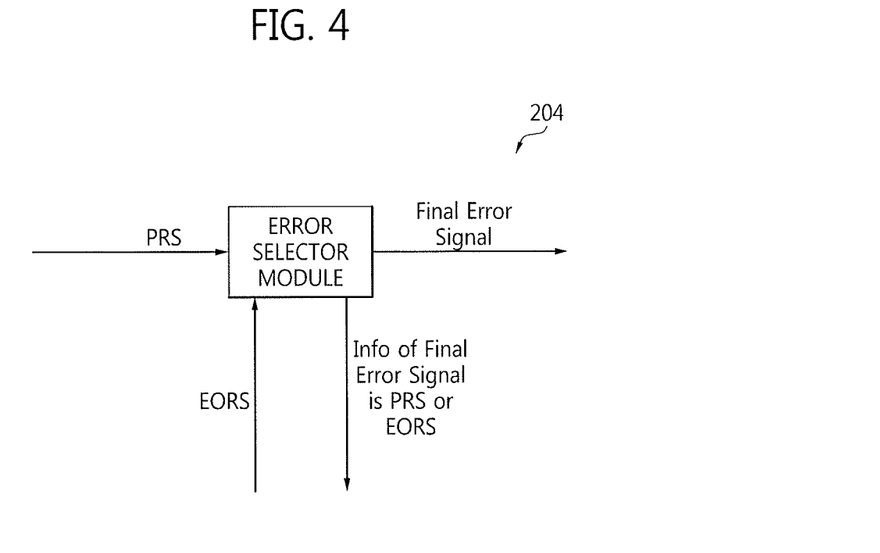
FIG. 4 illustrates an embodiment of an error signal selector module.

FIG. 4 illustrates an embodiment of an error signal selector module of the video data compression apparatus. The error signal selector module 204 takes the PRS and EORS as inputs. The error signal selector module 204 compares between the PRS and the EORS. The signal with the least error value is selected as the residual signal and given as output of error signal selector module 204. This residual signal is then transformed, quantized, and entropy coded. The module compares the PRS of the current MB and the EORS using SATD or one or more other predetermined metrics.

According to one embodiment, a flag is provided on at least one of a MB header, a slice header, a sequence header, or a picture header to reduce the number of bits required to signal, if the error signal in the bit stream corresponds to a PRS or an EORS. The flag(s) introduced into the headers may include an EORS_MB_FLAG, EORS_SEQ_FLAG, EORS_PIC_FLAG, and/or EORS_SLICE_FLAG.

The flag EORS_MB_FLAG is coded in the MB header. If this flag is 0, then the MB data corresponds to PRS. If the flag is 1, then the MB data corresponds to EORS. The flag EORS_SEQ_FLAG is listed in a sequence header. If this flag is 0, then none of the frames in the sequence contains EORS in the bit-stream. If the flag is 1, then one or more frames in the sequence have EORS. Similarly, the flag EORS_PIC_FLAG is introduced in a picture header. If this flag is 0, then none of slice in the picture contains EORS in the bit-stream. If the flag is 1, then one or more slice in the picture includes EROS. The flag EORS_SLICE_FLAG is introduced in the slice header. If this flag is 0, then none of MB in the slice has EORS. If the flag is 1, then one or more MB in the slice contains EROS.

Figure 5:
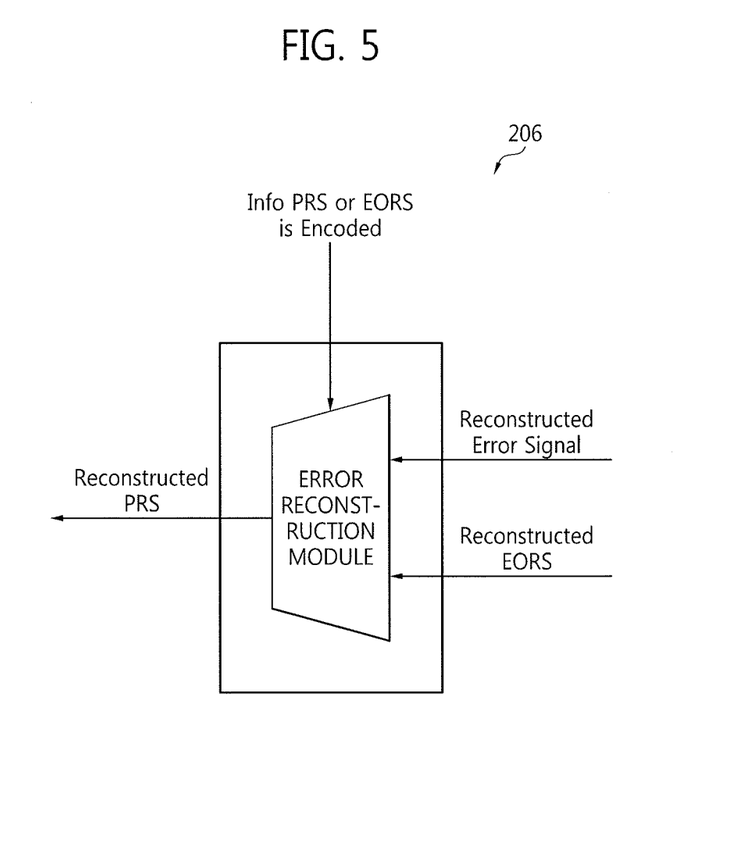
FIG. 5 illustrates an embodiment of an error reconstruction module.

FIG. 5 illustrates an embodiment of an error reconstruction module of the video data compression apparatus. The error reconstruction module 206 reconstructs the predicted residue signal (PRS) based on information extracted from the reconstructed error signal and the reconstructed error of the residue signal. Further, the module 206 adds the reconstructed residue signal to the predicted residual signal to obtain the residual signal. If the EORS is sent be encoded into the bit stream, then the reconstructed error signal is added to the RPRS and stored into the RRRF. Otherwise, the reconstructed error signal is directly stored into the RRRF.

Figure 6:
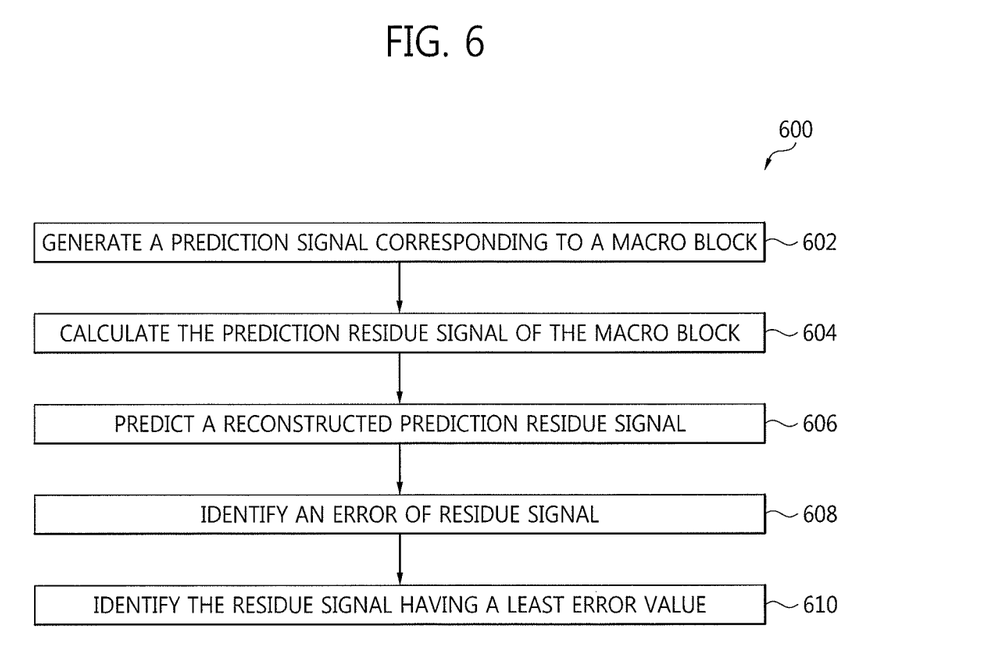
FIG. 6 illustrates an embodiment of a method for reducing redundancy in a residue signal in video data compression.

FIG. 6 illustrates an embodiment of a method 600 for reducing redundancy in residue signal in video data compression. Initially, the method includes generating a prediction signal (PS) corresponding to a Macro Block (MB), in operation 602. A prediction residue signal (PRS) of the MB is calculated from the prediction signal, in operation 604. A prediction residue signal is predicted using the reconstructed prediction signal (henceforth, referred as RPRS) for a previous reference frame stored in a storage device (e.g., $E^1 n-1$), in operation 606. An error of residue signal is calculated by subtracting the RPRS from the PRS, in operation 608. Further, the PRS of the current MB and the EORS is compared to identify the residue signal having the least (or a predetermined) error value, in operation 610. Here, the residue signal may be identified by correlating the prediction residue signal of the current MB and a reconstructed prediction residue signal (RPRS) of a reference frame. Then, the compressed video is transmitted in a stream to a receiver, which, for example, may be a user terminal.

By way of summation and review, in typical video coding standards, the raw video data (generally represented by YUV) is divided into Macro Blocks (MB) of size 16×16 or more. Each MB is predicted using spatial (intra predication) and temporal prediction (motion estimation) techniques, which is called predicted MB signal. The difference between predicted MB signal and the original B signal is called the prediction residue or prediction error signal. The prediction residue signal is then transformed to frequency domain, quantized and entropy coded to create the encoded bit stream. However, more energy in the prediction residue signal results in more energy of coefficients in DCT output. This in turn requires more bits to encode the coefficients.

Conventionally, data in predictor error signal is reduced using a correlation between the pixels in spatial and temporal domains. Generally, the residue prediction is applied in the spatial domain for inter macro blocks only. However, the prediction error signals are also correlated in the temporal domain for intra and inter macro blocks. The correlation in the residue signal is more in the temporal domain.

In contrast, one or more of the aforementioned embodiments may be directly adapted to current video coding standards. In the forward path of encoders, the prediction of the residue signal may be performed, the difference between residue and predicted residue signal may be calculated and the residue signal with least cost may be transformed, quantized, and entropy coded. In the reverse path, the reconstructed residue may be added to the predicted residue signal to get the actual residue signal. Further, the residue signal of each MB is stored for future reference. The reconstructed PRS may be used to reduce the redundancy in the error signal, particularly in the redundancy in prediction residue signal in the temporal domain. This, in turn, provides for the decoded image at the decoder side and the reconstructed image at the encoder side to be conformant.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of processing video data, the method comprising:
   generating a prediction signal (PS) corresponding to a Macro Block (MB);
   calculating a prediction residue signal (PRS) of the MB from the prediction signal (PS);
   predicting a reconstructed prediction residual signal (RPRS) from a reconstructed residue reference frame (RRRF);
   identifying an error of residue signal (EORS) by subtracting the RPRS from the PRS;
   comparing the PRS of the MB and the EORS;
   identifying a residue signal having a least error value based on a result of the comparison; and
   generating an encoded bit stream for transmission based on the residue signal having the least error value, wherein the residue signal is identified by correlating the prediction residue signal of the MB and the reconstructed prediction residue signal (RPRS) of a reference frame.

2. The method as claimed in claim 1, wherein generating the encoded bit stream includes performing a transformation to a frequency domain, quantizing, and entropy coding the residual signal with the least error value to generate the encoded bit stream.

3. The method as claimed in claim 1, wherein the MB prediction signal comprises at least one of an intra-prediction signal or an inter-prediction signal.

4. The method as claimed in claim 1, wherein the RPRS is calculated from at least one of:
   a collocated macro block of the reference frame;
   a motion vector of the current MB; or
   a motion estimation performed on the reconstructed residue reference frame (RRRF).

5. The method as claimed in claim 4, wherein the RPRS is calculated from the collocated macro block of the reference frame by:
   subtracting the reconstructed PRS from the RRRF corresponding to the collocated MB from the PRS of the current MB;
   comparing a value of the reconstructed PRS with a value of the PRS; and
   if the value of the reconstructed PRS is less than the value of the PRS, selecting the RPRS.

6. The method as claimed in claim 4, wherein the RPRS is calculated from the motion vector of the current MB by:
   subtracting the reconstructed PRS from the RRRF corresponding to the motion vector of the current MB from the current PRS;
   comparing a value of the reconstructed PRS with a value of the PRS; and
   if the value of the reconstructed PRS is less than the value of the PRS, selecting the RPRS.

7. The method as claimed in claim 4, wherein the RPRS is calculated by performing a motion estimation on the RRRF includes:
   performing a search of a current PRS within a search range on the RRRF, wherein the search is performed by selecting the motion vector of the current MB as a starting point; and
   selecting a RPRS based on the search.

8. The method as claimed in claim 1, further comprising:
   providing a flag on a MB header,
   wherein a value of the flag indicates if the error signal in a bit stream corresponds to the PRS or the EORS, and
   wherein the flag in the MB header includes an EORS_MB_FLAG.

9. The method as claimed in claim 8, wherein the flag to indicate the presence of error signal in the bit stream includes at least one of:
   an EORS_SEQ_FLAG listed in a sequence header;
   an EORS_PIC_FLAG listed in a picture header; or
   an EORS_SLICE_FLAG listed in a slice header.

10. The method as claimed in claim 4, further comprising:
    encoding a motion vector difference corresponding to the predicted RPRS in a bit stream, wherein a motion vector difference is calculated by subtracting the selected motion vector from the motion vector of the current MB.

11. The method as claimed in claim 1, further comprising:
    reconstructing the PRS based on information extracted from a reconstructed error signal and an reconstructed error of residue signal; and
    obtaining the residual signal by adding the reconstructed residue signal to the predicted residual signal.

12. An apparatus for processing video data compression, comprising:
    an error signal predictor module configured to predict a reconstructed prediction residual signal (RPRS) from a reconstructed residue reference frame (RRRF);
    a subtractor module to identify an error of residue signal (EORS) by subtracting the RPRS from a prediction residue signal (PRS) of a Macro Block (MB) from a prediction signal (PS) corresponding to the MB; and
    an error signal selector module configured to:
        compare the PRS of a current MB and the EORS; and
        identify a residue signal having a least error value, wherein the error signal selector module identifies the residual signal by correlating the prediction residue signal of the current MB and a reconstructed prediction residue signal (RPRS) of a reference frame.

13. The apparatus as claimed in claim 12, further comprising:
    an error reconstruction module configured to:
        reconstruct the PRS based on information extracted from a reconstructed error signal and an reconstructed error of residue signal; and
        obtain the residual signal by adding the reconstructed residue signal to the predicted residual signal.

14. A method for processing video data, the method comprising: generating a prediction residue signal (FRS) of a macro block of video data; generating a reconstructed prediction residual signal (RPRS) from a reconstructed residue reference frame (RRRF); determining an error of residue signal (EORS) by subtracting the RPRS from the FRS;
    comparing the PRS and the EORS;
    determining a residue signal having a least error value based on a result of the comparison; and
    generating an encoded bit stream for transmission based on the EORS, wherein generating the PSR includes generating a prediction signal (PS) corresponding to the macro block and calculating the PSR based on the PS, wherein the encoded bit stream for transmission is generated based on the residue signal having the least error value, and wherein the residue signal having the least error value is determined by correlating the prediction residue signal and the RPRS of a reference frame.

15. The method as claimed in claim 14, wherein the RPRS is generated from at least one of:
   a collocated macro block of the reference frame;
   a motion vector of a current macro block; or
   a motion estimation performed on the RRRF.

16. The method as claimed in claim 15, wherein the RPRS is generated from the collocated macro block of the reference frame by:
   subtracting the reconstructed PRS from the RRRF;
   comparing a value of the reconstructed PRS with a value of the PRS; and
   if the value of the reconstructed PRS is less than the value of the PRS, selecting the RPRS.

17. The method as claimed in claim 15, wherein the RPRS is determined based on the motion estimation on the RRRF by:
   performing a search of a current PRS within a search range on the RRRF, wherein the search is performed by selecting the motion vector of the current MB as a starting point; and
   selecting a RPRS based on the search.

* * * * *

UNITED STATES PATENT AND TRADEMARK OFFICE
CERTIFICATE OF CORRECTION

PATENT NO. : 9,667,988 B2  
APPLICATION NO. : 14/259602  
DATED : May 30, 2017  
INVENTOR(S) : Deepak Thumathajira Yenkappa Page 1 of 1

It is certified that error appears in the above-identified patent and that said Letters Patent is hereby corrected as shown below:

On the Title Page

Column 1 Item (54) should read -- METHOD AND APPARATUS FOR REDUCING REDUNDANCY IN RESIDUE SIGNAL IN VIDEO DATA COMPRESSION --.

Signed and Sealed this  
Second Day of April, 2019

Andrei Iancu  
*Director of the United States Patent and Trademark Office*